(12) United States Patent
Altshuler

(10) Patent No.: US 12,098,798 B2
(45) Date of Patent: Sep. 24, 2024

(54) CABLE JACKET FOR CABLE AND METHOD OF MANUFACTURING THE SAME

(71) Applicant: Canon U.S.A., Inc., Melville, NY (US)

(72) Inventor: Alexander Altshuler, Cambridge, MA (US)

(73) Assignee: Canon U.S.A., Inc., Melville, NY (US)

( * ) Notice: Subject to any disclaimer, the term of this patent is extended or adjusted under 35 U.S.C. 154(b) by 359 days.

(21) Appl. No.: 17/618,387

(22) PCT Filed: Jun. 8, 2020

(86) PCT No.: PCT/US2020/036661
§ 371 (c)(1),
(2) Date: Dec. 13, 2021

(87) PCT Pub. No.: WO2020/251898
PCT Pub. Date: Dec. 17, 2020

(65) Prior Publication Data
US 2022/0307644 A1    Sep. 29, 2022

Related U.S. Application Data

(60) Provisional application No. 62/860,126, filed on Jun. 11, 2019.

(51) Int. Cl.
| F16L 57/06 | (2006.01) |
| F16B 2/22 | (2006.01) |
| G02B 6/44 | (2006.01) |
| H02G 3/04 | (2006.01) |

(52) U.S. Cl.
CPC .............. *F16L 57/06* (2013.01); *F16B 2/22* (2013.01); *G02B 6/443* (2013.01); *H02G 3/0487* (2013.01)

(58) Field of Classification Search
CPC ............ F16L 57/06; F16L 9/17; F16L 59/022
USPC .................................. 138/128, 156, 166, 110
See application file for complete search history.

(56) References Cited

U.S. PATENT DOCUMENTS

| 1,435,311 | A | * | 11/1922 | Knight | F16L 59/022 |
| | | | | | 206/825 |
| 1,485,994 | A | * | 3/1924 | Salisbury | H02G 7/00 |
| | | | | | 174/136 |
| 1,933,279 | A | * | 10/1933 | Quarnstrom | B21C 37/101 |
| | | | | | 126/307 R |
| 2,884,958 | A | * | 5/1959 | Asselin, Sr. | B21C 37/101 |
| | | | | | 29/521 |
| 4,576,846 | A | * | 3/1986 | Noel | B29C 65/58 |
| | | | | | 428/188 |
| 4,944,976 | A | * | 7/1990 | Plummer, III | H02G 3/0481 |
| | | | | | 178/92 |

(Continued)

FOREIGN PATENT DOCUMENTS

| DE | 4042039 A1 | 7/1992 |
| DE | 19705761 A1 | 8/1998 |

(Continued)

*Primary Examiner* — Patrick F Brinson
(74) *Attorney, Agent, or Firm* — Canon U.S.A., Inc. IP Division

(57) ABSTRACT

An apparatus, method, and system for a cable jacket having a resealable closure, where the closure is adapted to protect the inner elements of the jacket without exposure to outside contaminants, even when the jacket is manipulated by bending and/or twisting.

18 Claims, 3 Drawing Sheets

(56) References Cited

U.S. PATENT DOCUMENTS

| | | | | |
|---|---|---|---|---|
| 5,505,230 | A | * | 4/1996 | Bartholomew ...... H02G 3/0481 |
| | | | | 138/167 |
| 5,814,767 | A | | 9/1998 | Katz |
| 6,341,626 | B1 | * | 1/2002 | Davenport ................ F16L 3/26 |
| | | | | 138/110 |
| 7,225,534 | B2 | | 6/2007 | Kachmar |
| 7,225,536 | B2 | | 6/2007 | Yang |
| 7,325,575 | B1 | * | 2/2008 | O'Donnell .............. F16L 57/06 |
| | | | | 138/156 |
| 9,052,042 | B2 | * | 6/2015 | May ........................ F16L 11/10 |
| 10,288,197 | B2 | * | 5/2019 | Grossman ............. H02G 9/065 |
| 2004/0149483 | A1 | | 8/2004 | Glew |
| 2009/0044903 | A1 | | 2/2009 | Clark |
| 2009/0211659 | A1 | | 8/2009 | Schelhaas |

FOREIGN PATENT DOCUMENTS

| | | | |
|---|---|---|---|
| DE | 19747623 | A1 | 4/1999 |
| GB | 406410 | A | 3/1934 |
| JP | S59-023214 | U | 2/1984 |
| JP | S59117411 | A | 7/1984 |
| JP | S6110416 | Y | 4/1986 |
| JP | H11223282 | A | 8/1999 |
| JP | 2000287330 | A | 10/2000 |
| JP | 2001507560 | A | 6/2001 |
| JP | 2006158041 | A | 6/2006 |
| JP | 2010004639 | A | 1/2010 |
| JP | 2011513664 | A | 4/2011 |
| JP | 2014191194 | A | 10/2014 |
| JP | 2014193108 | A | 10/2014 |

\* cited by examiner

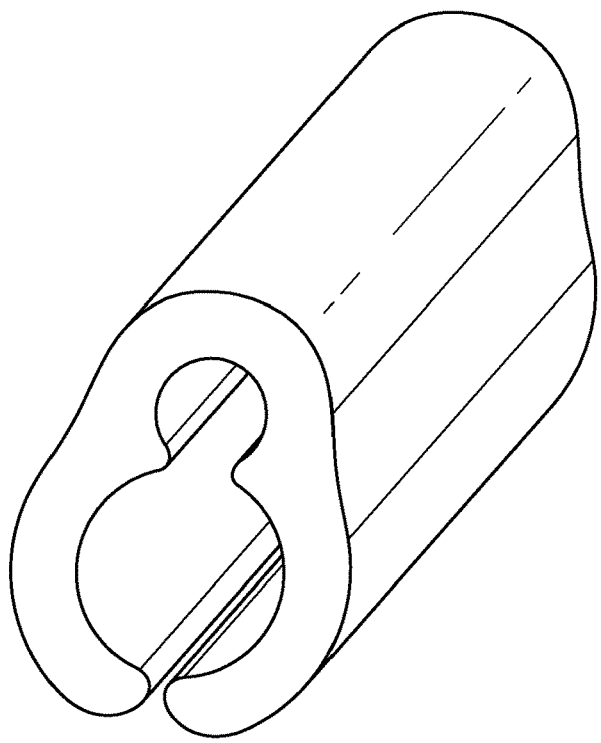
FIG. 1
(Prior Art)
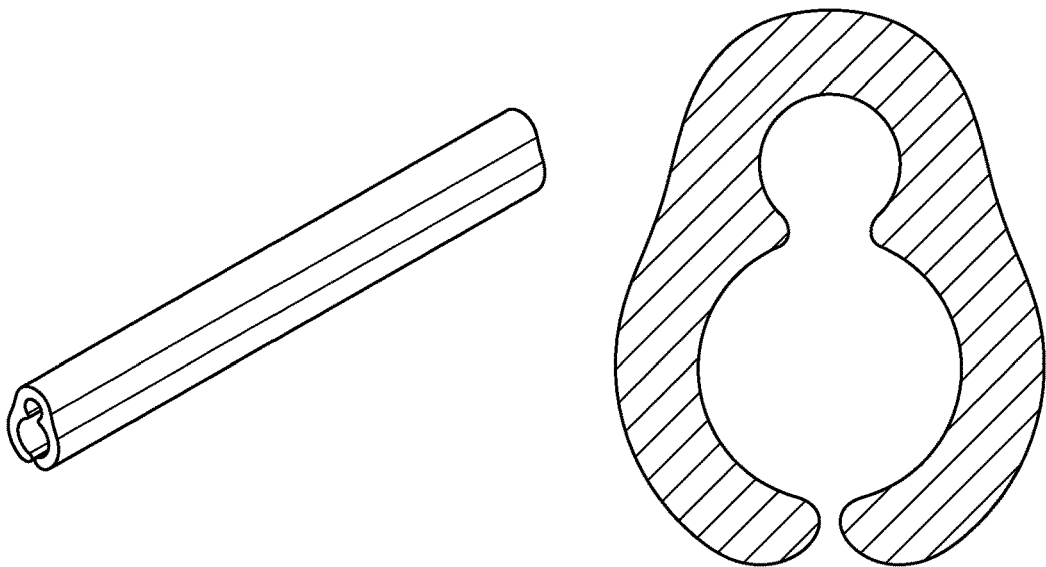
FIG. 2A
(Prior Art)
FIG. 2B
(Prior Art)

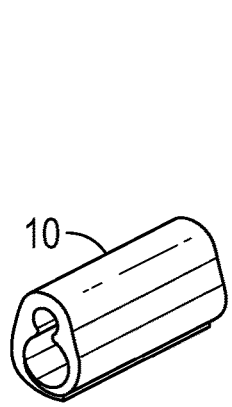
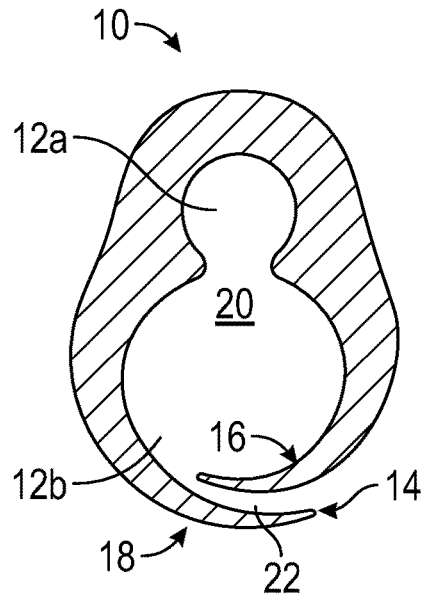
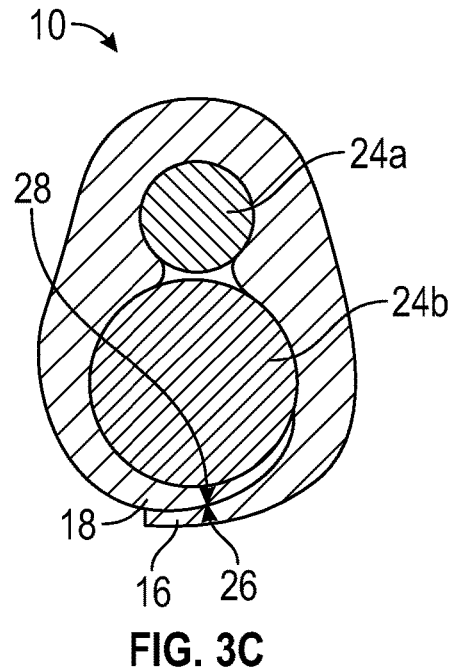
FIG. 3A  FIG. 3B  FIG. 3C
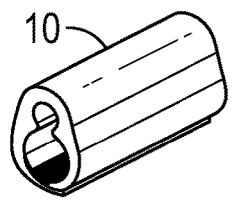
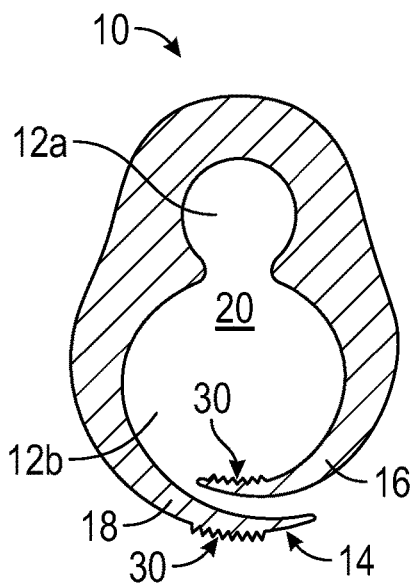
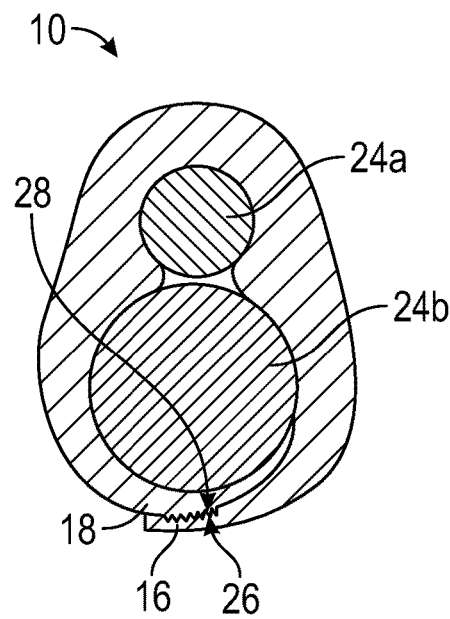
FIG. 4A  FIG. 4B  FIG. 4C

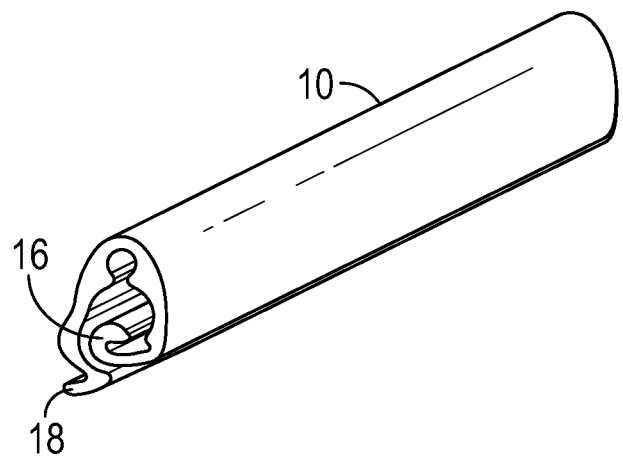
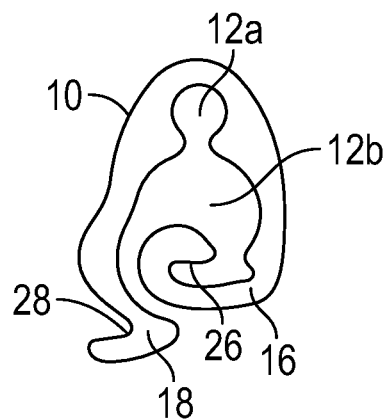
FIG. 5A                    FIG. 5B
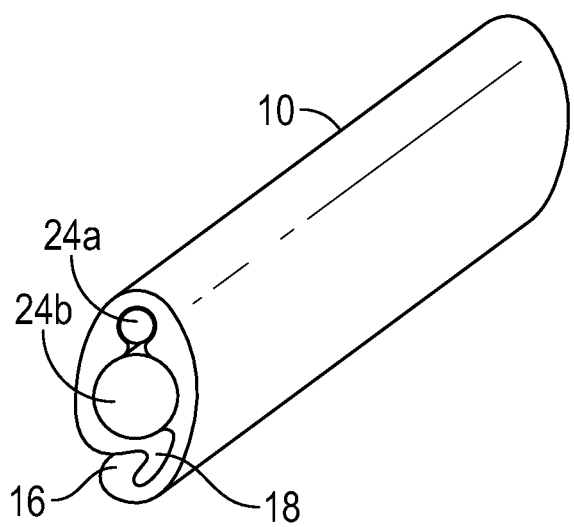
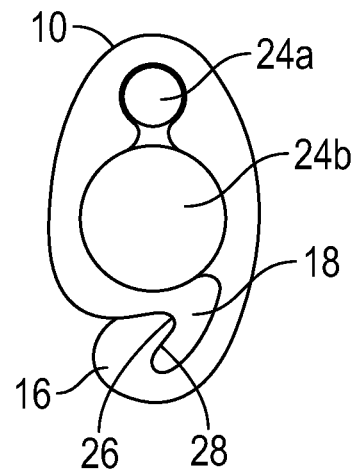
FIG. 6A                    FIG. 6B

CABLE JACKET FOR CABLE AND METHOD OF MANUFACTURING THE SAME

CROSS REFERENCE TO RELATED PATENT APPLICATIONS

This application claims priority from U.S. Provisional Patent Application No. 62/860,126 filed on Jun. 11, 2019, in the United States Patent and Trademark Office, the disclosure of which is incorporated herein in its entirety by reference.

FIELD OF THE DISCLOSURE

The present disclosure relates generally to apparatus and manufacturing methods for a cable jacket and, more particularly to a cable jacket capable of being manipulated without exposing the inner cables held in the jacket.

BACKGROUND OF THE DISCLOSURE

Cable jackets have been used for combining multiple electrical, fiber optical, and other cables in a protective casing, intended to protect the cables from outside elements and damage. Typically, various sub-components are incorporated in the cable jacket, which are used in a variety of devices. These subcomponent cables are often manufactured and produced at different facilities by different specialized production processes, and then brought together with the cable jacket for final assembly. At this point of manufacturing process, it is advantageous to combine the various subcomponent cables into a single hybrid cable in one jacket without removing the end connectors. The ability to disassemble and reassemble the single hybrid cable into sub-cables, some of which are often quite expensive, may be needed to facilitate cable repairs.

While extruded elastomeric cable jackets allowing for multiple assembly-disassembly exist, they suffer from a number of drawbacks. First, due to manufacturing constraints, they tend to separate when bent, which leads to exposing internal cables and allowing outside dirt and debris to penetrate the jacket. Second, if the jacket is reinforced to remain sealed, the jacket become stiff and unmanageable, thus reducing viability. Therefore, the need exists for a hybrid cable jacket design that is easily manufactured by common methods, and provides flexible and secure protection for the sub-component cables, while also allowing for easy access into the jacket should additional cables need to be added, or to facilitate repair to an existing cable found in the jacket. All the while allowing for easy sealing of the jacket after the repairs or addition.

By way of example, U.S. Pat. No. 7,225,536 to Kachmar (hereafter "Kachmar"), provides a cable having a jacket including a feature for allowing post-extrusion insertion of an optical fiber or other signal-transmitting member. Kachmar further relates to a method for making the cable having a jacket including a feature for allowing post-extrusion insertion of an optical fiber or other signal-transmitting member.

However, as stated above, the existing art suffers from a multitude of drawbacks which limit and hinder the current cable jackets. The subject disclosure aims to address these limitations.

SUMMARY

Thus, to address such exemplary needs in the industry, the presently disclosed apparatus, and methods for manufacturing the apparatus, wherein the apparatus comprises a cover for protecting one or more cables, having a flexible tubular body, at least one hollow channel extending the length of the flexible tubular body, and a resealable closure configured throughout the length of the flexible tubular body for providing access to the hollow channel, wherein the resealable closure comprises a first flap which at least partially overlaps the flexible tubular body, and the first flap is resiliently urged to abut the flexible tubular body.

In various embodiments, the cover further comprises a second flap overlapping the first flap, wherein the second flap is resiliently urged to abut the first flap.

In other embodiments of the subject disclosure, wherein when the first flap and second flap are not in direct contact with one another, the first flap is urged towards an innermost surface of the cover, and the second flap is urged towards an outermost surface of the cover, thus creating a gap.

In other embodiment, the cover further comprises a locking feature configured on each of the first flap and the overlaping portion of the flexible tubular body.

In various embodiment of the subject disclosure, the cover further comprises an adhesive layer applied to the first flap for adhesion to the flexible tubular body.

Another embodiment teaches a method for manufacturing a cover for a protecting one or more cables, the method comprising: extruding a flexible tubular body having at least one hollow channel extending the length of the flexible tubular body, and a resealable closure configured within the flexible tubular body for providing access to the hollow channel, wherein the resealable closure comprises a first flap which at least partially overlaps the flexible tubular body, and the first flap is resiliently urged to abut an inner surface of the flexible tubular body; opening the first flap to gain access to the hollow channel; inserting a cable into the hollow channel, and closing the first flap to seal the cable into the hollow channel.

In yet another embodiment, the opening of the first flap is accomplished by repositioning the first flap beyond the inner surface of the flexible tubular body, such that the first flap is urged beyond the flexible tubular body.

In another embodiment, closing the first flap is accomplished by repositioning the first flap inside the inner surface of the flexible tubular body, such that the first flap is urged against the flexible tubular body.

Further embodiments teach the first flap further comprising a locking feature configured on the overlaping portion of the flexible tubular body.

In addition, the flexible tubular body may also further comprise a locking feature configured on the overlaping portion of the first flap.

In yet additional embodiments, the first flap further comprises an adhesive layer applied to the first flap for adhesion to the flexible tubular body.

The subject innovation further teaches z cover for a protecting one or more cables, comprising: a flexible tubular body; at least one hollow channel extending the length of the flexible tubular body; and a resealable closure configured within the flexible tubular body for providing access to the hollow channel, wherein the resealable closure comprises a first flap and a second flap, wherein the first flap at least partially overlaps the second flap, and the first flap is resiliently urged to abut an inner surface of the second flap.

These and other objects, features, and advantages of the present disclosure will become apparent upon reading the following detailed description of exemplary embodiments of the present disclosure, when taken in conjunction with the appended drawings, and provided paragraphs.

BRIEF DESCRIPTION OF THE DRAWINGS

Further objects, features and advantages of the present invention will become apparent from the following detailed description when taken in conjunction with the accompanying figures showing illustrative embodiments of the present invention.

FIG. 1 depicts a side perspective view a cable jacket according to the existing art in the field of disclosure.

FIGS. 2a and 2b provide side and cut-away, respectively, views of a cable jacket according to the existing art in the field of disclosure.

FIGS. 3a, 3b and 3c provide side, cut-away open and cut-away closed, respectively, views of a cable jacket, according to one or more embodiments of the present subject matter.

FIGS. 4a, 4b and 4c provide side, cut-away open and cut-away closed, respectively, views of a cable jacket, according to one or more embodiments of the present subject matter.

FIGS. 5a and 5b provide side and cut-away open views, respectively, of a cable jacket, according to one or more embodiments of the present subject matter.

FIGS. 6a and 6b provide side and cut-away closed views, respectively, of a cable jacket, according to one or more embodiments of the present subject matter.

Throughout the Figures, the same reference numerals and characters, unless otherwise stated, are used to denote like features, elements, components or portions of the illustrated embodiments. In addition, reference numeral(s) including by the designation "'" (e.g. 12' or 24') signify secondary elements and/or references of the same nature and/or kind. Moreover, while the subject disclosure will now be described in detail with reference to the Figures, it is done so in connection with the illustrative embodiments. It is intended that changes and modifications can be made to the described embodiments without departing from the true scope and spirit of the subject disclosure as defined by the appended paragraphs.

DETAILED DESCRIPTION OF THE DISCLOSURE

The present disclosure details a cable jacket, and a manufacturing method thereof, wherein the cable jacket is capable of repeated assembly and disassembly, which allows for manipulation of the inner cables, while allowing the jacket to sufficiently protect the inner cables by preventing any exposure of the inner surface of the jacket to the environment.

As provided earlier, the current art in the field has several shortcomings associated with cable jackets. Namely, reassembled jackets are prone to separation when the jacket is manipulated and bent, thus exposing the delicate inner cables the jacket was designed to protect. As seen in FIG. 1, the prior art depicts a common jacket having two channels for accommodating two inner cables. The jacket is prone to separation, especially when the cable jacket is bent with the opening element configured on or near the outer periphery of the bend.

The above mentioned problems can be resolved by using the cable jacket disclosed in the present innovation. As provided in FIGS. 3a-c and 4a-c, the subject cable jacket 10 features two internal channels 12a and 12b and a resealable closure 14 configured for repeated sealing. In one embodiment, the closure may be made by extruding a flexible elastomeric material such as polyurethane, silicone, or a similar material. The internal channels 12a and 12b may be configured to accept desired sub-cables, as well as other lines/wires which may benefit from a protective jacket. The resealable closure 14 comprises of two non-connected flaps, inner flap 16 and outer flap 18, which overlap to seal the internal channels 12a and 12b. In the present embodiment, the inner flap 16 and outer flap 18 are tapered, but may incorporate other shapes as specified. The overlapping inner flap 16 and outer flap 18 are configured to remain in contact even if the cable jacket 10 is manipulated. In one embodiment, manipulation of the cable jacket 10 may lead to the inner flap 16 sliding along the outer flap 18 to retain the sealed jacket 10.

The inner flap 16 may be molded or otherwise configured to be resiliently urged towards the center 20 of the cable jacket 10, while the outer flap 18 may be molded or otherwise configured to be resiliently urged away from the center 20 of the cable jacket 10. Accordingly, and as seen in FIG. 3b, in the assembly configuration, the inner flap 16 is inside the outer flap 18 and urged towards the center 20 the jacket 10, while the outer flap 18 is outside the inner flap 16 and urged away from the center 20 of the jacket 10. This assembly configuration may create a gap 22 between the inner flap 16 and outer flap 18, thus allowing for easier access into the jacket 10 for addition and/or removal of a cable.

In the sealed configuration, and as seen in FIG. 3c, the inner flap 16 is outside the outer flap 18 and urged towards the center 20 the jacket 10, while the outer flap 18 is inside the inner flap 16 and urged away from the center 20 of the jacket 10. This sealed configuration urges the inner flap 16 and outer flap 18 together, thus urging the inner flap 16 and outer flap together to create a seal.

In the assembly configuration of FIG. 3c, the sub-cables 24a and 24b are inserted into corresponding channels 12a and 12b, and then the inner flap 16 and outer flap 18 are reversed so the corresponding contact surfaces 26 and 28, respectively, are facing and contacting each other. The resiliently deformed inner and outer flaps 16 and 18 will exert return forces on each other leading to positive closure of the cable jacket 10 through friction between contact surfaces 26 and 28.

Alternatively, only one of the two flaps, 16 and 18, may be resiliently deformed to create the return force necessary to urge the flaps together in the sealed configuration, as well as to create the gap 22 between the inner flap 16 and outer flap 18 in the assembly configuration.

As provided in FIGS. 4a-4c, and depending on the design, intent, and cable bending requirements, the contact surfaces 26 and 28 may be supplanted with additional features to further enhance closure opening and/or ease of manipulation of sub-cables 24a and 24b. In addition, the additional features may contribute to jacket 10 resilience during cable bending. For example, the contact surfaces 26 and 28 may be configured with ribbing or teeth 30, both symmetric (FIGS. 4b and 4c) and asymmetric self-locking, adhesive, either temporary or permanent, applied to one or both surfaces, zip-lock type closure, or other frictional means to further secure the contact surfaces 26 and 28 to secure the jacket 10.

Additional embodiments on the subject jacket are detailed in FIGS. 5a, 5b, 6a and 6b, wherein side and cut-away views, of the cable jacket are provided in the open (5a, 5b) and closed (6a, 6b) configuration. In these examples of the jacket 10, the two flaps, 16 and 18, may be resiliently deformed to create the return force necessary to urge the flaps together in the sealed configuration. In this embodiment, the two flaps, 16 and 18, have additional curves to increase the contact surface area between the two flaps, thus further ensuring the jacket 10 remains sealed when the jacket 10 is manipulated. As before, the flaps 16 and 18 are configured to create the gap 22 between the inner flap 16 and outer flap 18 in the disassembly configuration, in order to facilitate easier insertion and/or removal of the cables (not shown— 24*a* and 25*b*). The urging of the flaps, 16 and 18, further ensures the jacket 10 remains sealed in the closed configuration, thus protecting the cables from the outer elements.

Although a hook and loop type orientation has been detailed in FIGS. 5*a*, 5*b*, 6*a* and 6*b*, this disclosure is intended to include various different shapes and patterns which may be configured for various advantages, as the situation may deem necessary. By way of example only, a tongue and groove orientation may be utilized, or a "S" pattern may be utilized, as well as bevy of other known closure techniques.

The invention claimed is:

1. A cover for a protecting one or more cables, comprising:
   a flexible tubular body;
   at least one hollow channel extending a length of the flexible tubular body; and
   a resealable closure extending the length of the flexible tubular body for providing access to the hollow channel,
   wherein the resealable closure comprises a first flap which at least partially overlaps the flexible tubular body, and the first flap is resiliently urged to abut an inner surface of the flexible tubular body,
   wherein in an assembly configuration, the first flap is outside of the flexible tubular body and urged away from the hollow channel to create a gap to the hollow channel, and
   wherein in a sealed configuration, the first flap is inside of the flexible tubular body and urged away from the hollow channel to create a seal of the hollow channel.

2. The cover of claim 1, wherein the first flap is tapered in a direction towards a terminal end of the first flap.

3. The cover of claim 1, wherein the flexible tubular body abutting the first flap is tapered in a direction towards a terminal end of the flexible tubular body.

4. The cover of claim 1, further comprising a locking feature configured on each of the first flap and an overlaping portion of the flexible tubular body.

5. The cover of claim 1, further comprising an adhesive layer applied to the first flap for adhesion to the flexible tubular body.

6. The cover of claim 1, further comprising an adhesive layer applied to a portion of the flexible tubular body overlapping the first flap.

7. The cover of claim 1, further comprising a locking feature configured on either the first flap or the flexible tubular body.

8. A method for manufacturing a cover for a protecting one or more cables, the method comprising:
   extruding a flexible tubular body having at least one hollow channel extending a length of the flexible tubular body, and a resealable closure extending the length of the flexible tubular body for providing access to the hollow channel,
   wherein the resealable closure comprises a first flap which at least partially overlaps the flexible tubular body, and the first flap is resiliently urged to abut an inner surface of the flexible tubular body,
   opening the first flap to gain access to the hollow channel;
   inserting a cable into the hollow channel in an assembly configuration, and
   closing the first flap to seal the cable into the hollow channel in a sealed configuration,
   wherein in the assembly configuration, the first flap is outside of the flexible tubular body and urged away from the hollow channel to create a gap to the hollow channel, and
   wherein in the sealed configuration, the first flap is inside of the flexible tubular body and urged away from the hollow channel to create a seal of the hollow channel.

9. The method of claim 8, wherein opening the first flap is accomplished by repositioning the first flap beyond the inner surface of the flexible tubular body, such that the first flap is urged beyond the flexible tubular body.

10. The method of claim 8, wherein closing the first flap is accomplished by repositioning the first flap inside the inner surface of the flexible tubular body, such that the first flap is urged against the flexible tubular body.

11. The method of claim 8, wherein the first flap further comprises a locking feature configured on the overlaping portion of the flexible tubular body.

12. The method of claim 8, wherein the flexible tubular body further comprises a locking feature configured on the overlaping portion of the first flap.

13. The method of claim 8, wherein the first flap further comprises an adhesive layer applied to the first flap for adhesion to the flexible tubular body.

14. A cover for a protecting one or more cables, comprising:
   a flexible tubular body;
   at least one hollow channel extending the length of the flexible tubular body; and
   a resealable closure configured throughout a length of the flexible tubular body for providing access to the hollow channel,
   wherein the resealable closure comprises a first flap and a second flap, wherein the first flap at least partially overlaps the second flap, and the first flap is resiliently urged to abut an inner surface of the second flap,
   wherein in an assembly configuration, the first flap is outside of the flexible tubular body and urged away from the hollow channel to create a gap to the hollow channel, and
   wherein in a sealed configuration, the first flap is inside of the flexible tubular body and urged away from the hollow channel to create a seal of the hollow channel.

15. The cover of claim 14, further comprising a locking feature configured on each of the first flap and second flap.

16. The cover of claim 14, further comprising an adhesive layer applied to the first flap for adhesion to the second flap.

17. The cover of claim 14, further comprising an adhesive layer applied to the second flap for adhesion to the first flap.

18. The cover of claim 14, further comprising a locking feature configured on either the first flap or the second flap.

* * * * *